(12) United States Patent
Hanagata

(10) Patent No.: US 7,158,326 B2
(45) Date of Patent: Jan. 2, 2007

(54) DATA STORAGE LIBRARY AND ACCESSOR CONTROL METHOD

(75) Inventor: Tadashi Hanagata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/072,417

(22) Filed: Mar. 7, 2005

(65) Prior Publication Data

US 2005/0197736 A1 Sep. 8, 2005

(30) Foreign Application Priority Data

Mar. 8, 2004 (JP) ............................. 2004-064102

(51) Int. Cl.
*G11B 17/00* (2006.01)

(52) U.S. Cl. ..................... 360/69; 700/214; 369/30.61; 360/92

(58) Field of Classification Search ..................... None
See application file for complete search history.

(56) References Cited

U.S. PATENT DOCUMENTS

| | | | | |
|---|---|---|---|---|
| 5,128,912 A * | 7/1992 | Hug et al. | ................ | 369/30.61 |
| 5,818,723 A * | 10/1998 | Dimitri | ........................ | 700/214 |
| 6,064,544 A * | 5/2000 | Wada | .......................... | 360/92 |
| 2003/0210493 A1* | 11/2003 | Smith et al. | ............. | 360/98.06 |
| 2004/0249496 A1* | 12/2004 | Sumi et al. | .................. | 700/214 |
| 2005/0069400 A1* | 3/2005 | Dickey et al. | ............... | 414/277 |
| 2005/0152061 A1* | 7/2005 | Hoelsaeter | ..................... | 360/92 |

FOREIGN PATENT DOCUMENTS

| | | |
|---|---|---|
| JP | 4-23118 | 1/1992 |
| JP | 5-36187 | 2/1993 |
| JP | 6-52611 | 2/1994 |
| JP | 6-251485 | 9/1994 |
| JP | 10-255373 | 9/1998 |
| JP | 11-39768 | 2/1999 |

* cited by examiner

*Primary Examiner*—Andrew L. Sniezek
(74) *Attorney, Agent, or Firm*—McGinn IP Law Group, PLLC

(57) ABSTRACT

A data storage library for storing a storage media, wherein a plurality of accessors accesses the data storage media stored in an array of storage cells includes a first accessor transporting the storage media, the first accessor including a first carriage storing or retrieving the storage media on to the storage cell and a first guide guiding the first carriage moving vertically; a second accessor transporting the storage media, the second accessor including a second carriage storing or retrieving the storage media on to the storage cell and a second guide guiding the second carriage moving vertically; and a third guide guiding the first accessor and the second accessor moving horizontally. The first carriage opposes the second carriage and the first and second carriages are in a staggered configuration, when the first guide exists between the array and the second guide.

14 Claims, 13 Drawing Sheets

DATA STORAGE LIBRARY AND ACCESSOR CONTROL METHOD

FIELD OF THE INVENTION

The present invention relates to a data storage library for storing multiple storage media such as magnetic tapes, optical discs, etc. and selectively supplying the storage medium thereof to process information to a drive and a method of controlling driving of an accessor to carry the storage medium in the data storage library.

BACKGROUND OF THE INVENTION

Conventionally, there are techniques relating to a data storage library, such as the ones described in Patent Documents 1 to 6 mentioned later for instance. The technique described in Patent Document 1 is one for, as to multiple accessors moving on a common rail, controlling the accessor based on flag information indicating operational states of other accessors. The technique in Patent Document 2 is the for, as to the multiple accessors moving on the common rail, writing information on their respective destinations to storage portions recognizable from their respective control portions so as to prevent a collision between the accessors. The technique in Patent Document 3 is one for operating on the common rail a first medium carrying mechanism moving between a medium cabinet and an auxiliary cabinet and a second medium carrying mechanism moving between the auxiliary cabinet and a recording and reading apparatus.

The technique described in the Patent Document 4 is one for dividing a storage rack for storing magnetic tapes into two and allocating to each of divided areas one robot hand for storing and ejecting the magnetic tape.

The technique in Patent Document 5 is one for providing a medium storage rack of a polygonal post having a rack for storing the medium on each face and rotating on its axis and taking and returning the media from and to the racks on different faces thereof with two medium handling mechanisms.

The technique in Patent Document 6 is one for providing multiple picker mechanisms to one medium handling mechanism so as to simultaneously take out or store multiple media.

[Patent Document 1] Japanese Patent Laid-Open No. 4-023118
[Patent Document 2] Japanese Patent Laid-Open No. 10-255373
[Patent Document 3] Japanese Patent Laid-Open No. 6-251485
[Patent Document 4] Japanese Patent Laid-Open No. 6-052611
[Patent Document 5] Japanese Patent Laid-Open No. 5-036187
[Patent Document 6] Japanese Patent Laid-Open No. 11-039768

As for the techniques in Patent Documents 1 to 3 described above, however, all of them move multiple accessors on a common rail. Therefore, considering the collision between the accessors, a moving range of each accessor on the rail is limited so that it is difficult to carry a recording medium efficiently. In the case where a place for saving the accessor is provided at a rail end in order to avoid the collision, there is an inconvenience that a size of a data storage library housing becomes larger accordingly.

The technique in Patent Document 4 has a predetermined work area for each accessor for the cabinet of the recording medium. Therefore, there is a possibility that, if work concentrates in one area, carrying work may be delayed.

The technique in Patent Document 5 has a configuration in which the cabinet of the polygonal post rotates on its axis between two fixed accessors. Therefore, there is an inconvenience that the recording media capable of being handled simultaneously by both the accessors are limited to those in a predetermined positional relation of the polygonal post such as opposed faces.

The technique in Patent Document 6 can store and eject multiple recording media. It is difficult, however, to render the carrying work more efficient because it cannot simultaneously perform a storage operation and an ejection operation of different recording media.

SUMMARY OF THE INVENTION

In view of the foregoing and other exemplary problems, drawbacks, and disadvantages of the conventional techniques, it is an exemplary feature of the present invention to provide a data storage library and an accessor control method for efficiently operating multiple accessors while miniaturizing a data storage library housing.

The present invention provides a exemplary data storage library for storing a storage media. In accordance with the present invention, the data storage library comprises a first array of storage cells for storing the storage media, a first accessor transporting the storage media, the first accessor including a first carriage storing or retrieving the storage media on to the storage cell and a first guide guiding the first carriage moving vertically, a second accessor transporting the storage media, the second accessor including a second carriage storing or retrieving the storage media on to the storage cell and a second guide guiding the second carriage moving vertically, a third guide guiding the first accessor and the second accessor moving horizontally.

The first carriage may oppose the second carriage and the first and second carriages are in a staggered configuration, when the first guide exists between the first array and the second guide.

The data storage library may further comprises a first moving mechanism letting the first accessor move along the third guide and a second moving mechanism letting the first accessor move along the third guide. A width of each the first and second carriages may be narrower than a distance between the first and second guide.

The data storage library may further comprise a second array of storage cells for storing the storage media, the second array of storage cells opposing the first array of storage cells by sandwiching the third guide. A sum of the width of the first and second moving mechanisms may be smaller than the distance between the first array of storage cells and the second array of storage cells.

The first carriage and the second carriage may be mutually connected and both of the carriages may move simultaneously by driving one of the carriages.

The first carriage and the second carriage may include a convex portion and a concave portion, being horizontally connectable to each other.

The first carriage and the second carriage may include the convex portion and concave portion, being connectable to each other in an overlapping state.

The plurality of cells of each of the array may be oriented in an extending direction of each of the third guide and in an extending direction of each of the first and second guide.

The present invention also provides an exemplary method for controlling accessors of the data storage library. In the method, set a current position of the first carriage and a target position to which the first carriage should move to; presume a first position to which the first carriage moves after a predetermined time when moving from the current position to the target position; presume a second position to which the second carriage moves after a predetermined time; determine whether or not the first carriage collides with the second carriage based on the presumed positions; and move the first carriage to the first position when the first carriage is determined not to collide with the second carriage.

In a case that the first carriage is determined to collide with the second carriage, determine whether or not the second carriage can move to another second position; and in a case that the second carriage can move to another second position, move the second carriage to the another second position.

In a case that the first carriage is determined to collide with the second carriage, determine whether or not the second carriage can move to another second position; and in a case that the second carriage cannot move to another second position, seek another first position to which the first carriage can move for allowing the first carriage to move to the target position.

In a case that the first carriage is determined not to collide with the second carriage, move the first carriage to another first position.

In the method determine whether or not the first carriage collides with the second carriage based on another first position and the second position; and in a case that the first carriage collides with the second carriage, stop the movement of the first carriage until the second carriage leaving the second position.

The positions relating to the first and second carriages may be defined by the positions of the cells of the first array.

The positions relating to the first and second carriages may be defined by the positions of the cells of the second array.

The present invention also provides an exemplary signal-bearing medium embodying a program of machine-readable instructions executable by a data processing apparatus. The program causes accessors of a data storage library to perform the following. Set a current position of a first carriage and a target position to which said first carriage should move to; presume a first position to which said first carriage moves after a predetermined time when moving from said current position to said target position; presume a second position to which a second carriage moves after a predetermined time; determine whether or not said first carriage collides with said second carriage based on said presumed positions; and move said first carriage to said first position in a case that said first carriage is determined not to collide with said second carriage.

The data storage library, the storage media, the array, the storage cell, the accessor, the carriage, the first guide, the second guide, the third guide, the moving mechanism and the data processing apparatus could be embodied in the form of a library apparatus, a medium, a medium cabinet, a slot, an accessor, a handling mechanism, a support, a support, a rail, a traveling mechanism and a library control portion shown in FIGS. 1 and 2, respectively.

The first position and the second position could be embodied in the form of a next position of the accessor and a next position of the other accessor shown in FIGS. 7 and 13, respectively. Another second position and another first position could be embodied in the form of a slot S6 and a slot S2 shown in FIG. 8, respectively. Another second position and another first position also could be embodied in the form of an evacuation position and another next position described below, respectively.

According to the data storage library of the present invention, it is possible to miniaturize the data storage library housing. This advantage can be provided because a pair of rails, on which each accessor glides are laid in parallel, and there are handling mechanisms capable of going up and down a support between a support 4 of an accessor 1 and a support 14 of an accessor 11. More specifically, it is because, when the accessor 1 and 11 pass each other, opposed handling mechanisms 10 and 20 can pass each other by being vertically separated. In other words, a handling mechanism 20 opposes a handling mechanism 10 and the handling mechanism 20 and 10 are in a staggered configuration, when the support 14 exists between medium cabinets 23 and the support 4. Thus, a moving range of each accessor is not limited so that carrying work can be rendered more efficient.

According to the accessor control method of the present invention, as to the data storage library, it is possible, on moving one of the accessors, to determine a route until arriving at destination according to an operating state of the other accessor so as to prevent a collision between the accessors. Thus, it is possible to avoid a delay in the carrying operation due to a failure of the accessor caused by the collision.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

DETAILED DESCRIPTION OF THE EXEMPLARY EMBODIMENTS

Figure 1:
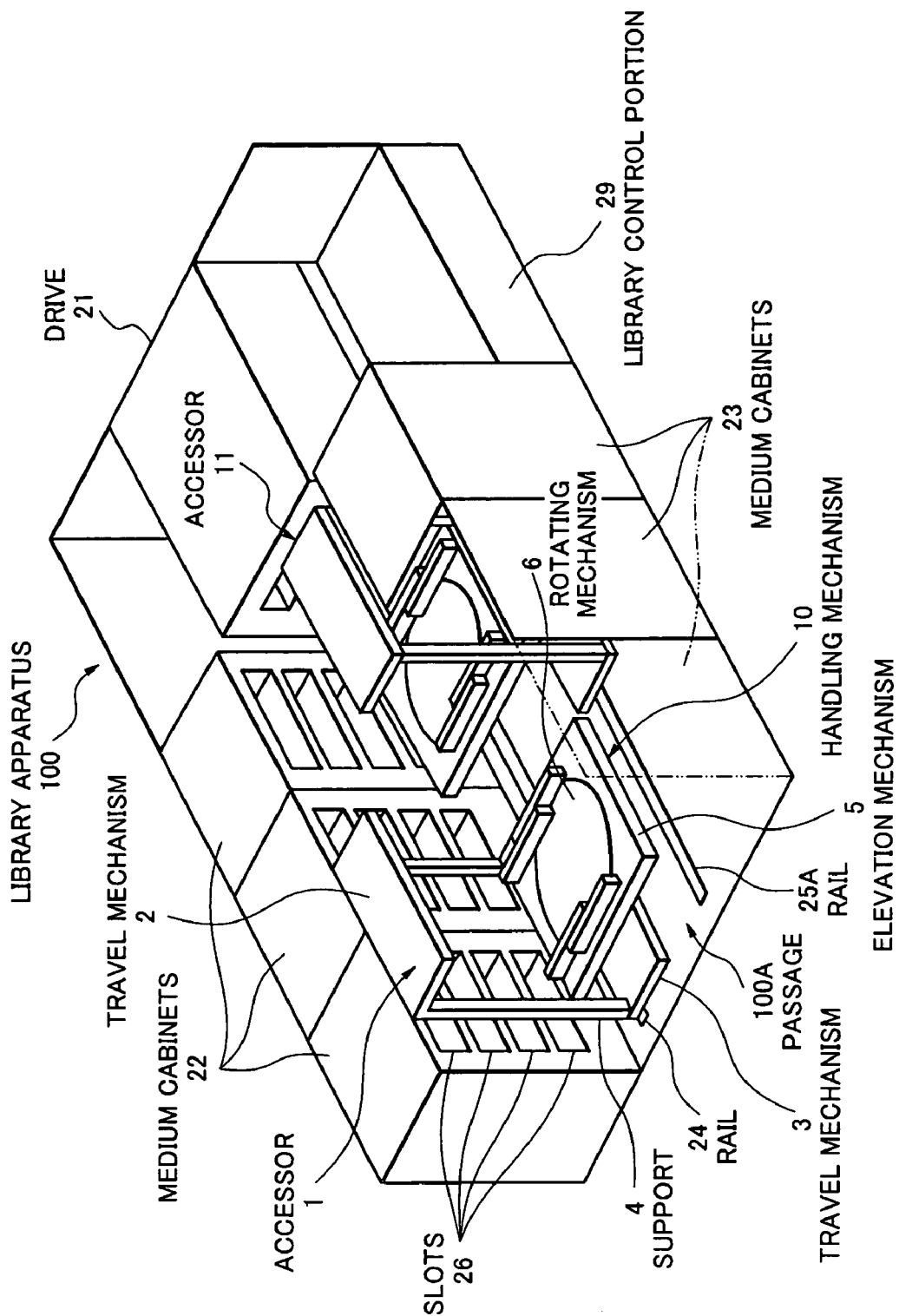
FIG. 1 is a block diagram showing a configuration of a library apparatus of an exemplary embodiment according to the present invention.

Hereunder, the present invention will be described in detail by using the drawings. FIG. 1 is a perspective view of a library apparatus 100 of an exemplary embodiment according to the present invention. The library apparatus 100 has multiple slots 26 which are openings for storing record media respectively, and also includes medium cabinets 22 and 23 having the multiple slots 26 opposed by sandwiching a passage 100a, a drive 21 placed at one end of the passage 100a for processing information by using a recording medium, rails 24a and 25a mutually extended in parallel along the passage 100a, an accessor 1 for traveling along the rail 24a, an accessor 11 for traveling along the other rail 25a and a library control portion 29 for monitoring a state of each component of the library apparatus 100 and controlling operation thereof. The library control portion 29 has a signal-bearing medium embodying a program of machine-readable instructions executable by the library control portion 29.

An example shown in FIG. 1 has a configuration in which the library control portion 29 controls the two accessors 1 and 11. However, it may also have the configuration in which the two accessors 1 and 11 are controlled by different control portions respectively. In that case, the two control portions should be connected in advance to be capable of communication.

The medium cabinets 22 and 23 mutually have the same configuration. For instance, the multiple slots 26 of the medium cabinet 22 are placed vertically and horizontally in an extending direction of the rail 24a and along a support 4 of the accessor 1 mentioned later. Namely, the medium cabinet 22 opposes the medium cabinet 23 by sandwiching rail 24a therebetween. The plurality of slots 26 of the medium cabinet 22 and 23 are oriented in an extending direction of the rail 24a and in an extending direction of the support 4. This exemplary embodiment assumes a magnetic tape as the recording medium stored by the medium cabinets 22 and 23. However, it may also be another recording medium such as an optical disk.

Figure 2:
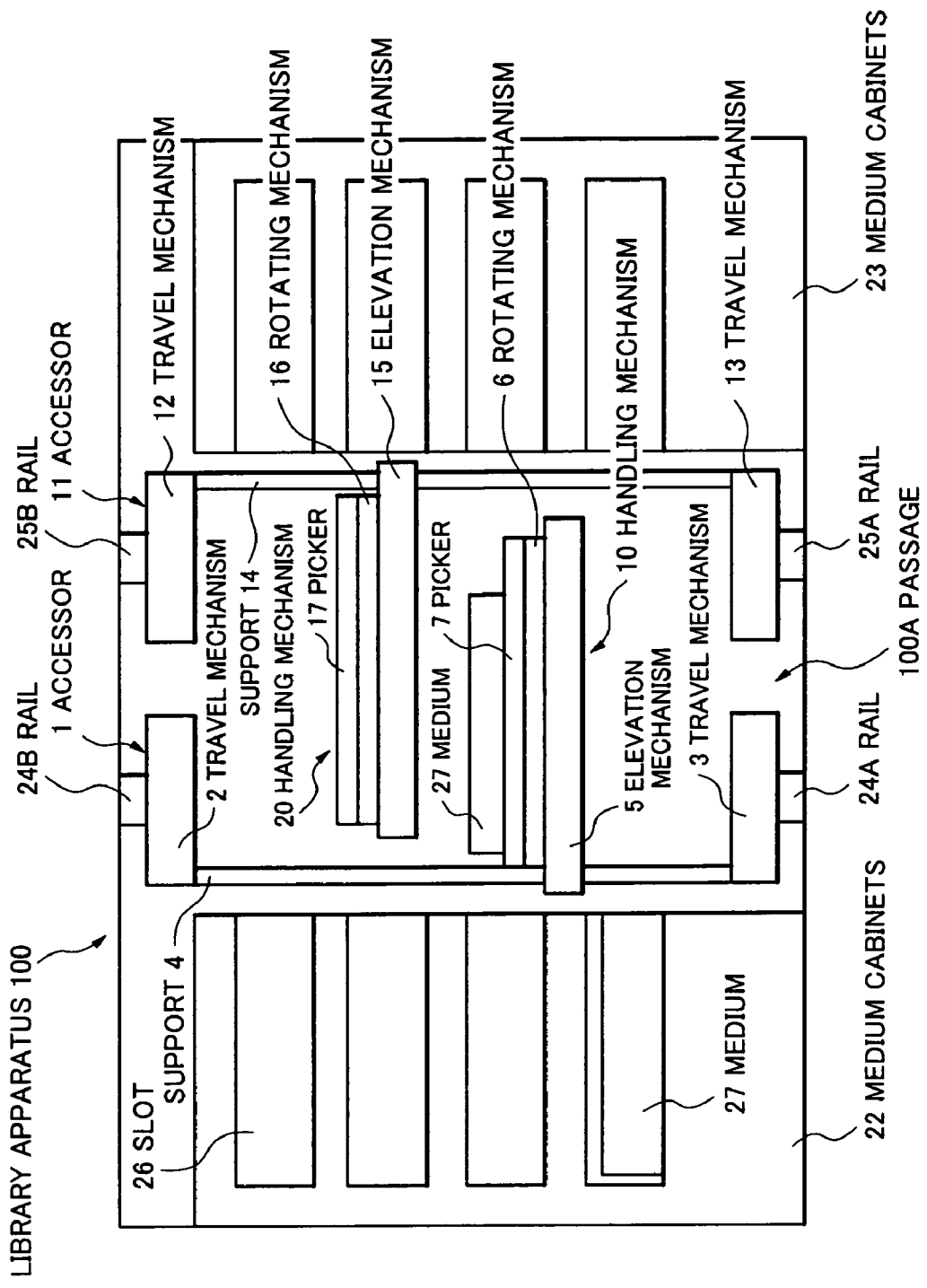
FIG. 2 is a front view of the library apparatus of the exemplary embodiment.

FIG. 2 is a front view of the library apparatus 100. As shown in FIG. 2, the library apparatus 100 also includes rails 24b and 25b over the accessors 1 and 11 in addition to the rails 24a and 25a laid beneath them. More specifically, the accessor 1 glides along the rails 24a and 24b, horizontally, while the other accessor 11 glides along the rails 25a and 25b, horizontally. The example in FIG. 2 has the configuration for supporting each accessor with two rails over and beneath it. However, the number of rails is not limited thereto. For instance, it is also possible to provide only the rails beneath it without providing the rails over it or support it with four rails of two rails over it and beneath it, respectively.

The accessors 1 and 11 mutually have the same configuration. As shown in FIG. 2, the accessor 1 has travel mechanisms 2 and 3 for letting the accessor 1 horizontally glide along the rail 24a beneath it and the rail 24b over it, the support 4 extended from the travel mechanisms 2 and 3, and a handling mechanism 10 for performing a vertically elevating operation along the support 4 and grasping the recording medium. The handling mechanism 10 exists between the support 4 of the accessor 1 and a support 14 of the accessor 11 mentioned later. The handling mechanism 10 is cantilever-supported by the support 4 to freely go up and down. A free end opposite to the side supported by the support 4 is the side on which the other accessor 11 exists.

The handling mechanism 10 has an elevation mechanism 5 for going up and down along the support 4, a picker 7 for grasping a recording medium 27 on the elevation mechanism 5, and a rotating mechanism 6 for rotating the recording medium 27 together with the picker 7.

The other accessor 11 has travel mechanisms 12 and 13, the support 14 and a handling mechanism 20 having an elevation mechanism 15, a rotating mechanism 16 and a picker 17 provided thereon. They perform the same functions as corresponding components of the accessor 1.

Here, basic operation of the accessors 1 and 11 of this embodiment will be described by taking the accessor 1 for example. The accessor 1 horizontally travels along the rails 24a and 24b by the travel mechanisms 2 and 3 based on instructions of the library control portion 29, and vertically elevates the handling mechanism 10 along the support 4 by means of the elevation mechanism 5. Thus, it moves the handling mechanism 10 to the front of the slots 26 of the medium cabinet 22 or 23. At that time, the library control portion 29 determines a traveling route so as to render a traveling distance of the accessor 1 as short as possible. Determination of the traveling route will be described in detail later.

Figure 3:
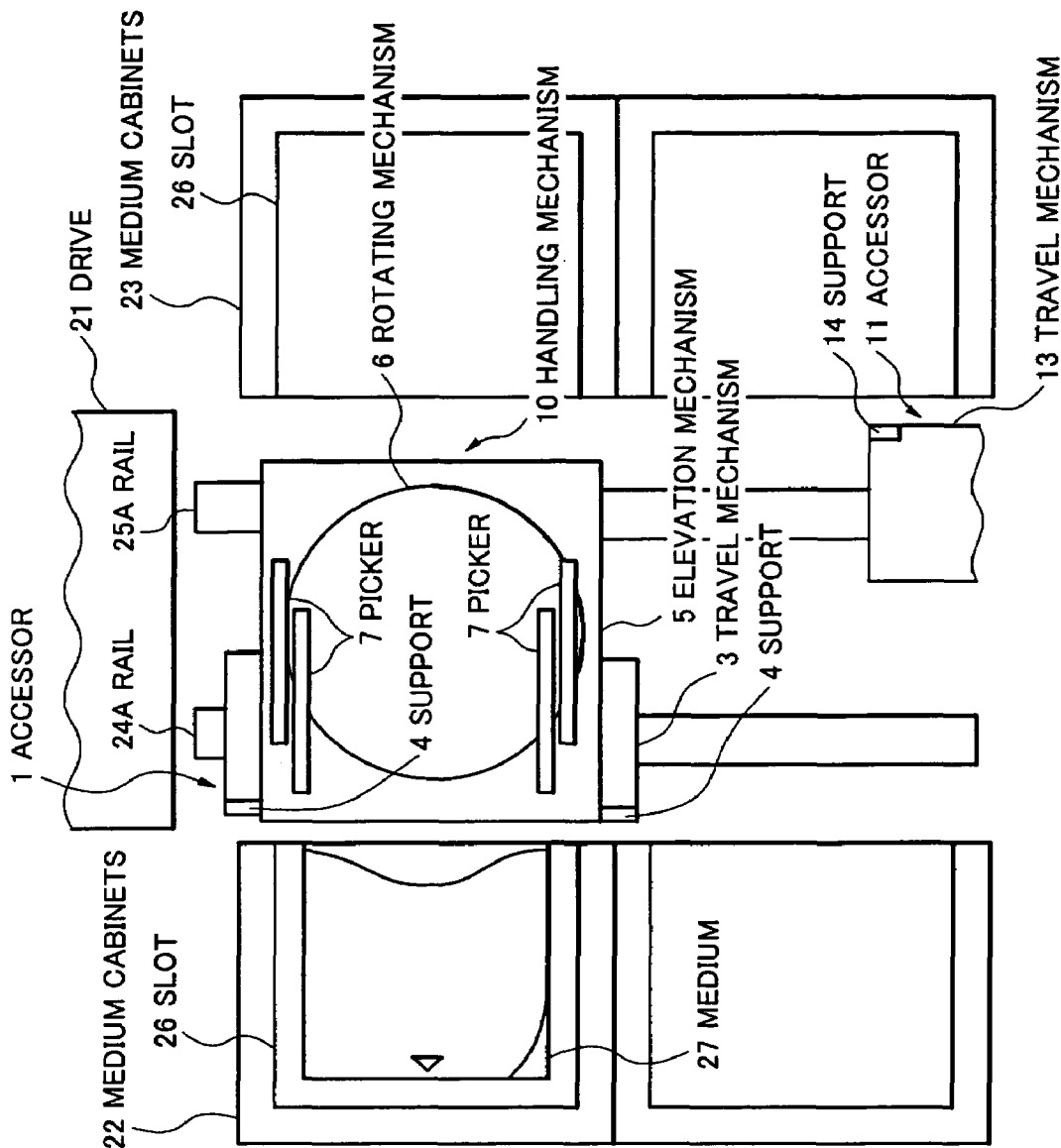
FIG. 3 is a partial plan view of the library apparatus of the exemplary embodiment.

FIG. 3 is a partial plan view of the library apparatus of the embodiment. The functions of the rotating mechanism 6 and picker 7 of the accessor 1 will be described by using FIG. 3. The rotating mechanism 6 is a mechanism for orienting the picker 7 in a direction of one of the medium cabinet 22, medium cabinet 23 and drive 21. In the case of retrieving the recording medium 27 from the medium cabinet 22, the rotating mechanism 6 orients the picker 7 to a target slot 26 of the medium cabinet 22. Further it extends and widens the end of the picker 7 to hold the recording medium 27 in the slot 26, and returns the picker 7 in a state in which the picker 7 is holding the recording medium 27 so as to place the recording medium 27 on the rotating mechanism 6.

When storing the recording medium 27 in the drive 21 or the slot 26, the picker 7 is oriented in a target direction by the rotating mechanism 6, the picker 7 holding the recording medium 27 is extended so as to insert the recording medium 27 into the target slot 26 or drive 21. Then, the picker 7 is opened to release the recording medium 27, and is returned to the handling mechanism 10.

The elevation mechanism 5 of the handling mechanism 10 and the elevation mechanism 15 of the handling mechanism 20 have a width dimension narrower than a distance between the support 4 and support 14 respectively. Of the components of the accessor 1 (11), the width dimension refers to the width dimension of the component having the most protruding portion on the other accessor side. In the case of the accessor 1 for instance, it refers to the dimension in a horizontal direction of the elevation mechanism 5 in the front view shown in FIG. 2. Therefore, when the accessors 1 and 11 are opposed, there arises a gap between the elevation mechanism 5 of the accessor 1 and the support 14 of the other accessor 11 and between the elevation mechanism 15 of the accessor 11 and the support 4 of the other accessor 1.

The lower travel mechanisms 3 and 13 and the upper travel mechanisms 2 and 12 have the width dimension narrower than half the distance between the support 4 and support 14 respectively. The sum of the width of the lower travel mechanisms 3 and 13 and the sum of the width of the upper travel mechanisms 2 and 12 are smaller than the distance between the medium cabinets 22 and medium cabinets 23. Additionally, the width of each handling mechanism 10 and 20 is narrower than a distance between the support 4 and 14. Further when the accessors 1 and 11 are opposed, there arises a gap between the travel mechanisms 3 and 13 and between the travel mechanisms 2 and 12, as shown in FIG. 2.

It is possible, by designing the elevation mechanisms 5 and 15, the travel mechanisms 3 and 13 and the travel mechanisms 2 and 12 to the above-mentioned dimensions, to have the accessors 1 and 11 gliding on the passage 100a pass each other. Thus, a moving range of each accessor is alleviated compared to a conventional state so as to exploit the accessors effectively on the passage 100a.

In the example shown in FIG. 2, the travel mechanisms 3 and 13 and the travel mechanisms 2 and 12 have a width narrower than half the distance between the support 4 and support 14 likewise respectively. However, it is also possible, if a gap can be created between them, to design them so that, for instance, one of the travel mechanisms 3 and 13 should have the above dimension and the other should have a larger dimension. In conclusion, the sum of the width of the lower travel mechanisms 3 and 13 and the sum of the width of the upper travel mechanisms 2 and 12 are smaller than the distance between the medium cabinets 22 and medium cabinets 23.

It is also possible to miniaturize an apparatus housing designed to have the above-mentioned dimensions. It is because there exists the handling mechanism 10 and 20 capable of laying a pair of rails in parallel for each accessor to glide on and elevating along the support between the support 4 of the accessor 1 and the support 14 of the accessor 11. In other words, a handling mechanism 20 opposes a handling mechanism 10 and the handling mechanism 20 and 10 are in a staggered configuration, when the support 14 exists between medium cabinets 23 and the support 4. More specifically, it is because, when the accessors 1 and 14 pass each other, the opposed handling mechanisms 10 and 20 can pass each other by being vertically separated.

Figure 4:
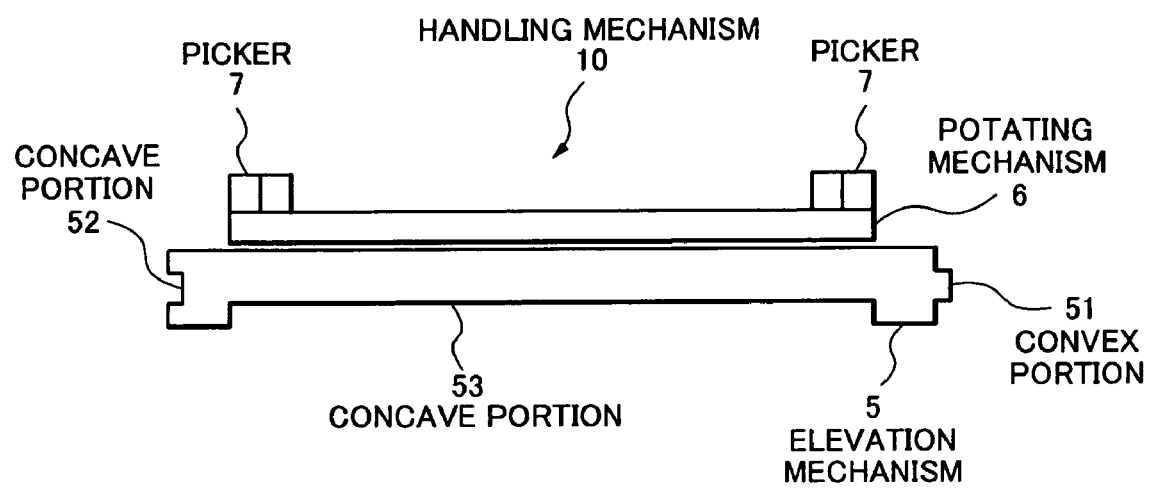
FIG. 4 is a front view of a handling mechanism of the library apparatus of the exemplary embodiment.

The handling mechanisms 10 and 20 in this embodiment have auxiliary means related to the present invention. The auxiliary means will be described by using FIGS. 4 to 6. FIG. 4 is an enlarged front view of the handling mechanism 10 of the accessor 1. As shown in FIG. 4, the handling mechanism 10 has a convex portion 51 formed on one side of the elevation mechanism 5, a concave portion 52 formed on the other side, and a concave portion 53 formed on a bottom face thereof as the auxiliary means. The convex portion 51, concave portion 52 and concave portion 53 are also formed likewise on the elevation mechanism 15 of the handling mechanism 20 of the accessor 11.

The auxiliary means related to the present invention is the means for, when one of the accessors 1 and 11 becomes inoperable due to a failure, assisting in the operation of the accessor with the other accessor. In this case, the handling mechanism 20 and 10 are mutually connected and both of the handling mechanisms move simultaneously by driving one of the handlings. The library apparatus 100 of the embodiment uses the auxiliary means to connect the handling mechanism 10 to the handling mechanism 20 horizontally or connect them in an overlapping state so as to handle the failure of the accessor.

Figure 5:
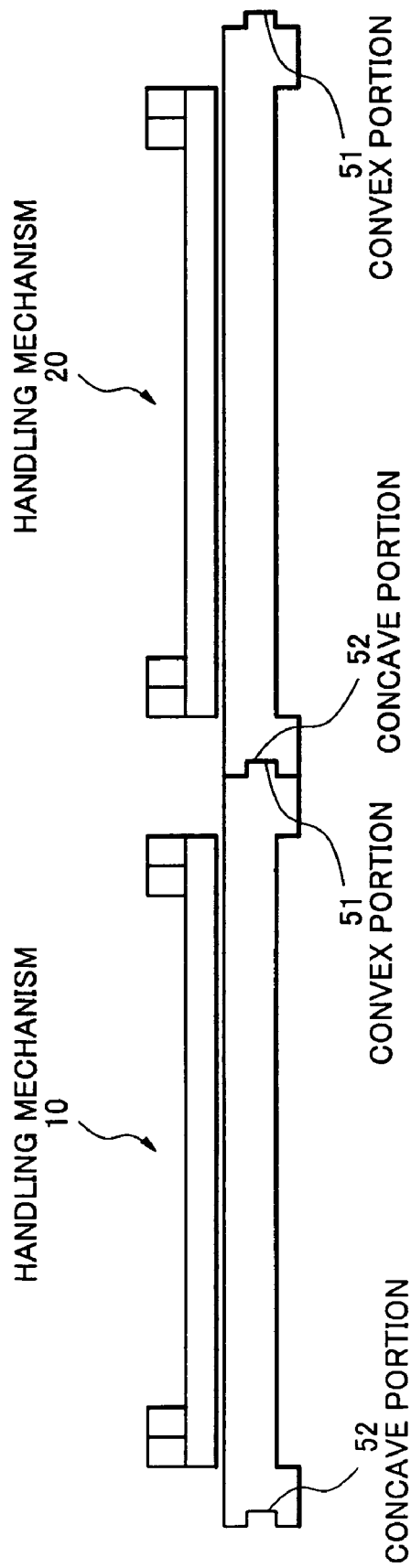
FIG. 5 is a schematic diagram for describing the auxiliary means of the exemplary embodiment.

FIG. 5 is a schematic diagram for describing the auxiliary means of the embodiment and describing the case of connecting the handling mechanism 10 to the handling mechanism 20 horizontally. For instance, in the case where the handling mechanism 10 as one of them cannot perform the elevating operation due to a motor failure, the convex portion 51 thereof is connected to the concave portion 52 of the other handling mechanism 20 capable of the elevating operation. The convex portion 51 and concave portion 52 of the handling mechanisms 10 and 20 are designed to engage with each other. The other handling mechanism 20 is operated in the state of having them connected so that the handling mechanism 10 performs the elevating operation together with the handling mechanism 20. Such assistance of the handling mechanism 20 allows the failed handling mechanism 10 to travel.

Figure 6:
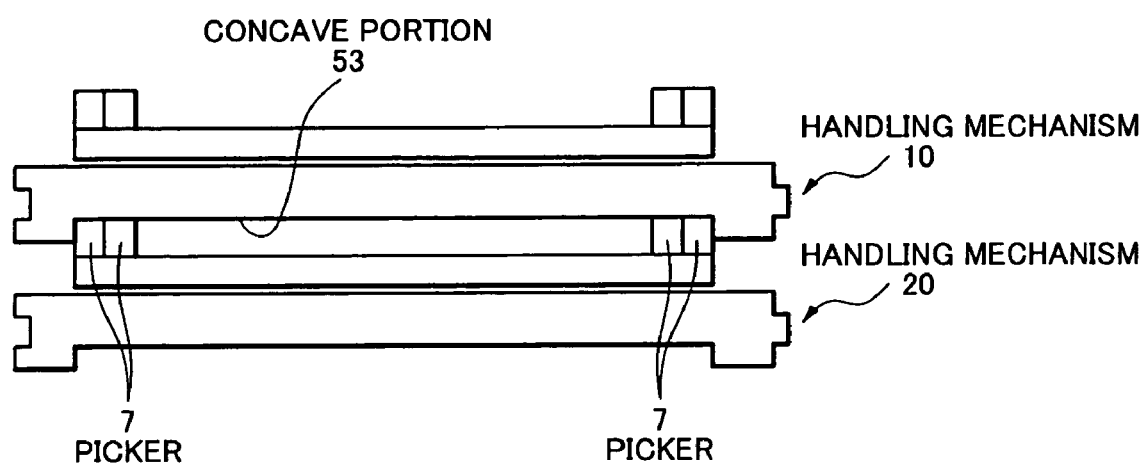
FIG. 6 is a schematic diagram for describing the auxiliary means of the exemplary embodiment.

Next, FIG. 6 is a schematic diagram for describing the auxiliary means of the exemplary embodiment, which is the schematic diagram in the case of connecting the handling mechanism 10 to the handling mechanism 20 in the overlapping state. An example of using the concave portion 53 as the auxiliary means will be described by using FIG. 6. For instance, in the case where the accessor 1 as one of the accessors cannot glide due to a failure, the concave portion 53 of the handling mechanism 10 is connected to the picker 7 of the other handling mechanism 20 of the accessor 11 capable of gliding. More specifically, it is a method of using the picker 7 of the other handling mechanism 20 as the convex portion to pair off with the concave portion 53 of the handling mechanism 10, where the handling mechanism 10 is connected to the handling mechanism 20 in the vertically overlapping state.

And the accessor 11 of the handling mechanism 20 glides in a connecting state as in FIG. 6 so that the accessor 1 glides together with the accessor 11. Thus, even if the accessor 1 becomes incapable of gliding due to the failure, it is possible to have the handling mechanism 10 travel in the extending direction of the rails 24a and 24b.

As for the auxiliary means described along with FIGS. 5 and 6, there is a procedure for assisting in the travel of the handling mechanism 10 with the handling mechanism 20. Inversely, it is also possible to apply connection methods shown in FIGS. 5 and 6 in the case of assisting in the travel of the handling mechanism 20 with the handling mechanism 10. It is also possible to connect them by interchanging a positional relation of the handling mechanisms 10 and 20 shown in FIGS. 5 and 6.

Figure 7:
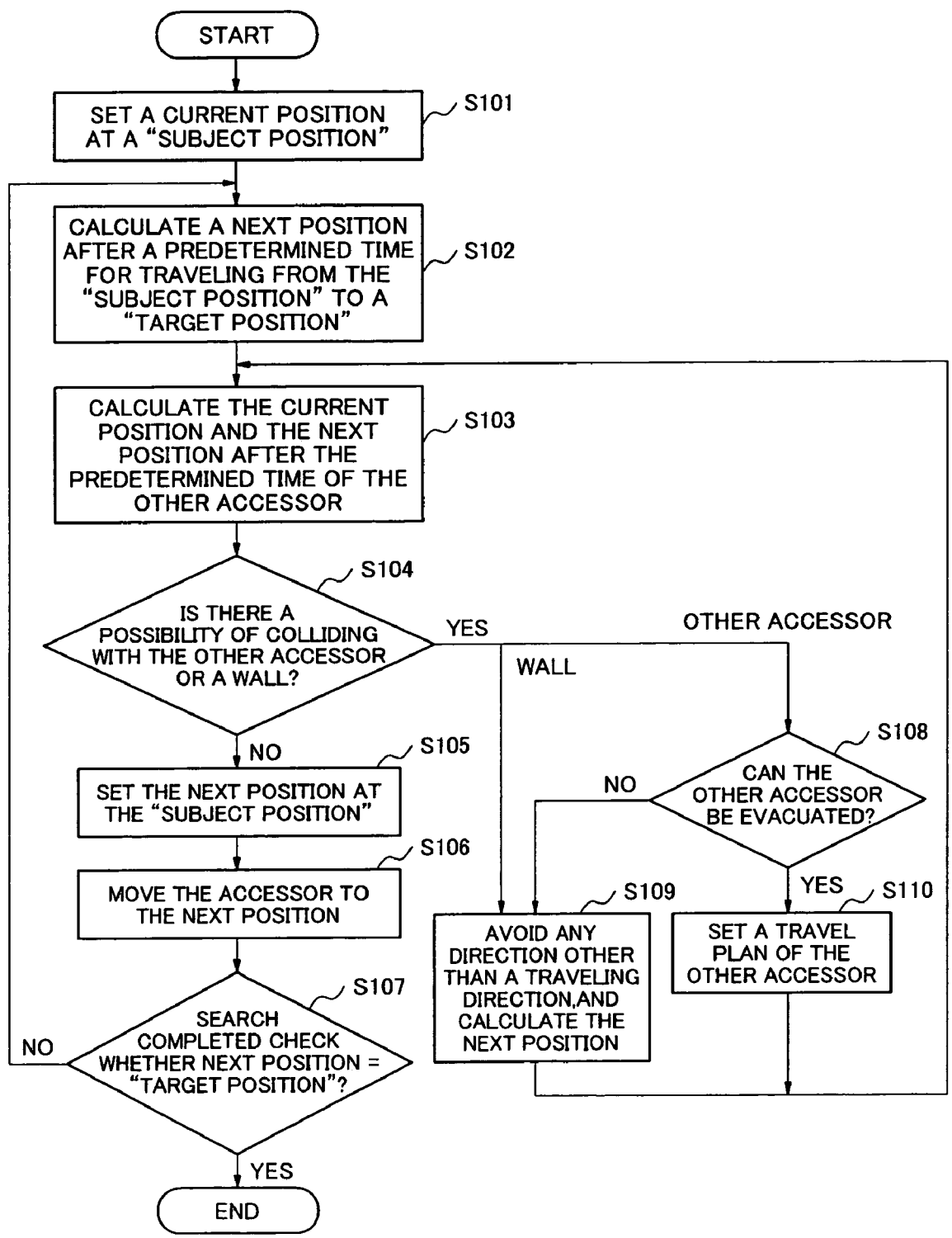
FIG. 7 is a flowchart showing a procedure of an accessor control method of the exemplary embodiment.
Figure 8:
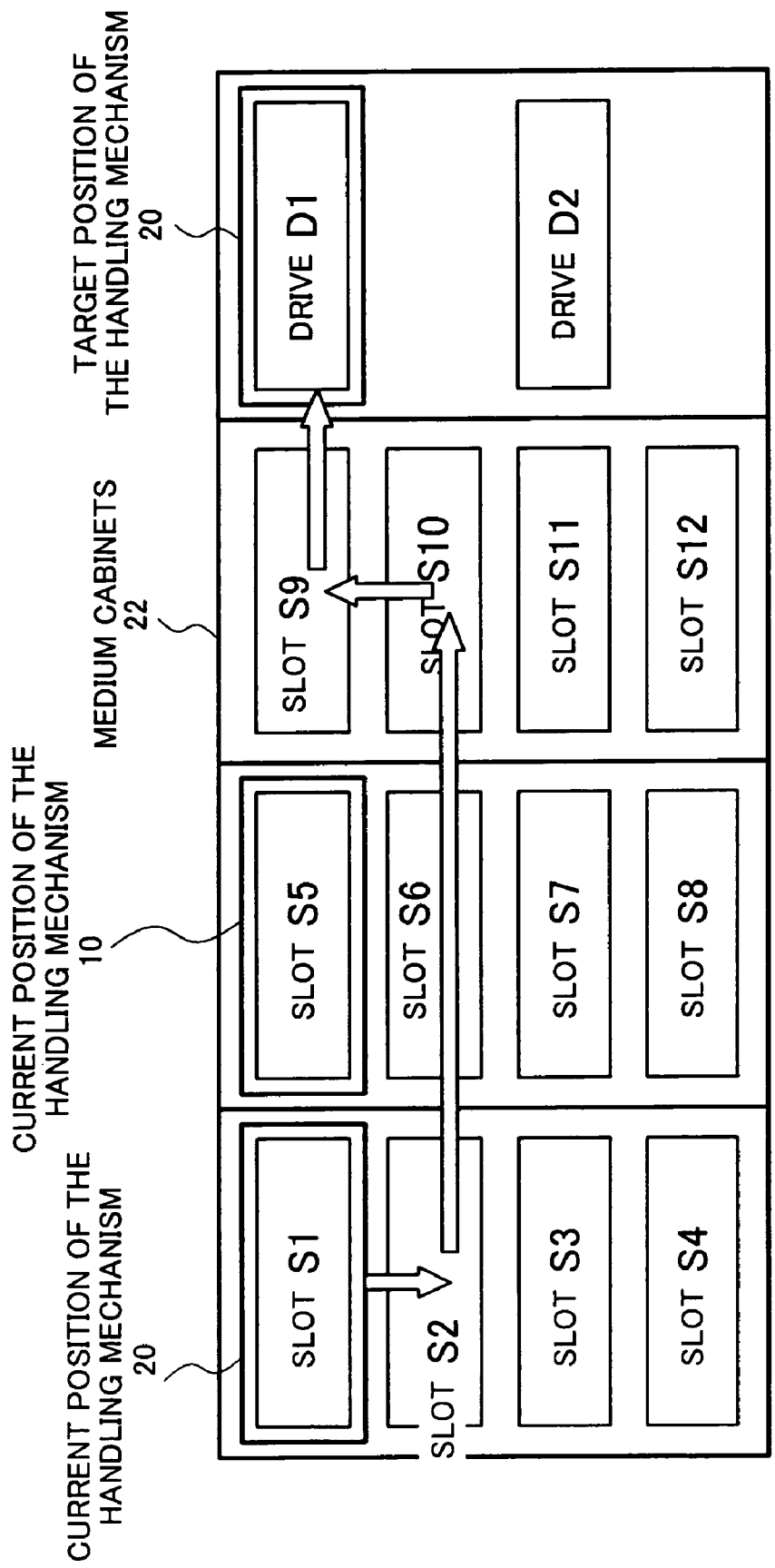
FIG. 8 is a schematic diagram relating to traveling routes of the handling mechanisms of the exemplary embodiment.

FIG. 7 is a flowchart showing a procedure of an accessor control method of the embodiment. An example of applying the accessor control method according to the present invention to the library apparatus 100 will be described by following the flowchart in FIG. 7. Here, for the sake of description, it is assumed that the positions relating to the handling mechanism 20 and 10 are defined by the positions of the slots 26, of the medium cabinets 22 or 23. Namely, it is assumed that slots S1 to S12 corresponding to the slots 26 of the medium cabinet 22 and drives D1 and D2 which are openings of the drive 21 are arranged as shown in FIG. 8. A description will be given as to a control procedure of the library control portion 29 on moving the handling mechanism 20 of the accessor 11 from the slot S1 to the drive D1 while the handling mechanism 10 of the accessor 1 is accessing the slot S5.

First, the slot S1 as a current position of the accessor 11 is set at a "subject position" to be monitored, and the drive D1 is set at a "target position" to be a final destination (step S101). Next, the position to which the accessor 11 travels from the slot S1 after a predetermined time is acquired. As it is moved to render a difference in coordinates smaller here, the next position after the predetermined time is presumed to be the slot S5 from FIG. 8 (step S102).

The current position and the next position after the predetermined time of the other accessor 1 are calculated (step S103). Here, as the accessor 1 is working at the slot S5 and is stopping, both the current position and next position of the accessor 1 are the slot S5. After acquiring the current positions and next positions of the accessors 1 and 11, a collision check of the accessors 1 and 11 is performed. The handling mechanism 20 is moved to the next position in a case that the accessor 11 is not determined to collide with the accessor 1. Namely, the handling mechanism 20 is moved to the next position in a case that the handling mechanism 20 is not determined to collide with the handling mechanism 10.

FIG. 8 is a schematic diagram relating to traveling routes of the handling mechanisms of the exemplary embodiment. As shown in FIG. 8, both the next positions of the accessors 1 and 11 are the slot S5, and so it is determined that they will collide (step S104: YES, the other accessor). Further it is checked whether the other accessor 1 can be evacuated. If the accessor 1 is to travel to the slot S6 for instance, it is determined that the accessor 1 can be evacuated and this travel plan is set (step S108: YES, S110). Namely, in a case that the accessor 1 can move to another next position, that means, in a case that the handling mechanism 10 can move to another next position, the handling mechanism 10 is moved to the another next position.

Figure 9:
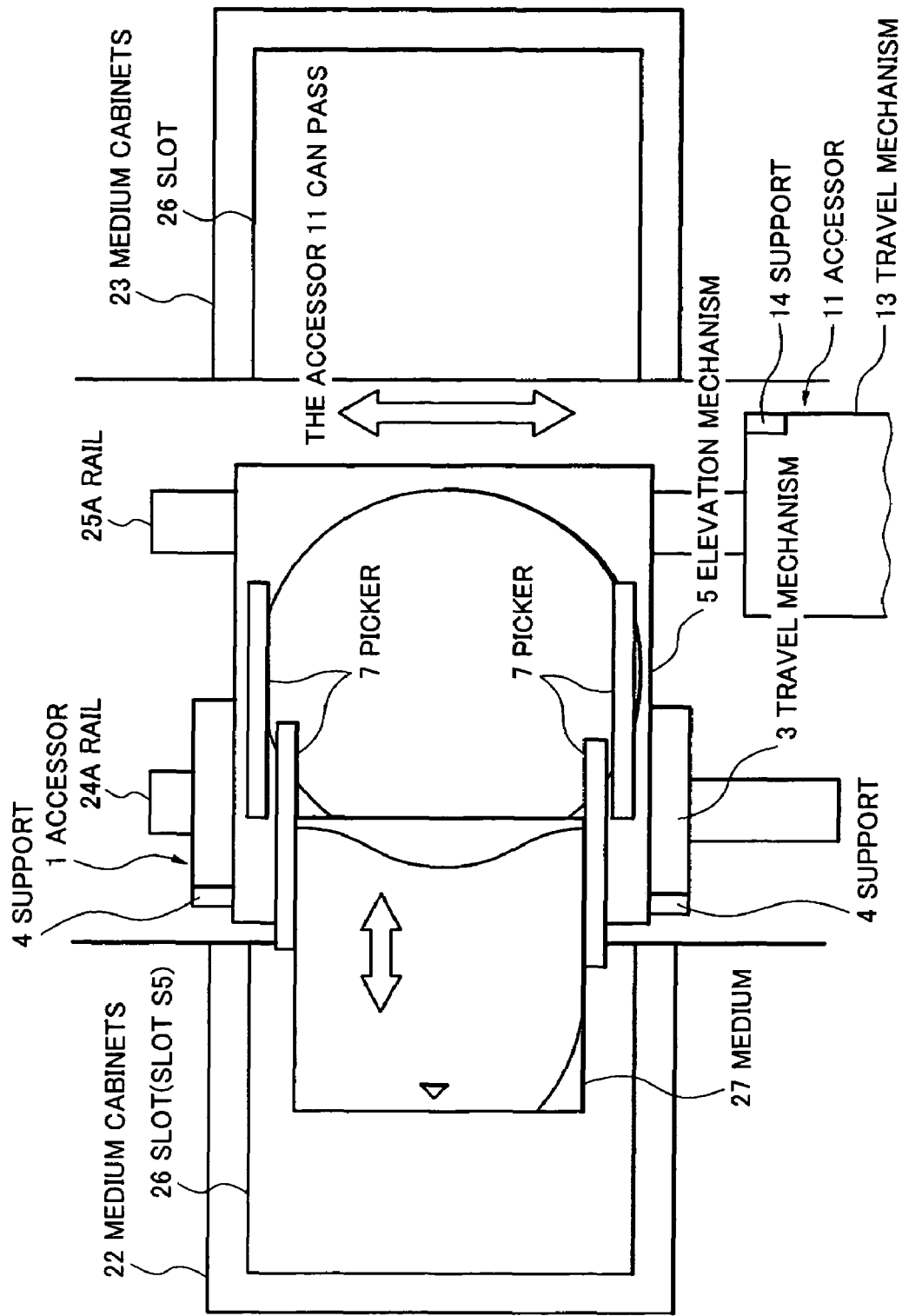
FIG. 9 is a schematic diagram relating to operation of the handling mechanism of the exemplary embodiment.

FIG. 9 is a schematic diagram relating to the operation of the handling mechanism of the exemplary embodiment. The accessor 1 is accessing the slot S5 of the medium cabinet 22 as described above. To be more precise, it is in a situation shown in FIG. 9. In this situation, it is not possible to move the accessor 1 which is working (step S108: NO) . It is possible for the accessor 11, however, to glide on the rail 25a and pass the accessor 1 by lowering the handling mechanism 20 further than the other handling mechanism 10. To be more specific, it refers to the state in which the positional relation of the handling mechanisms 10 and 20 is reversed in FIG. 2. Thus, when the accessor 1 is accessing the medium cabinet 22 for instance, it is determined that the accessor 1 and accessor 11 can pass each other.

In a case that the accessor 1 cannot move to another next position, that is, in a case that the handling mechanism 10 cannot move to another next position, seeking another next position to which the handling mechanism 20 moves for allowing the handling mechanism 20 to move the target position. Namely, another next position is calculated for the accessor 11 to be capable of passing the accessor 1 (step S109). On calculating the next position, referring to FIG. 8, it will collide with a wall of the library apparatus 100 if processed likewise from the step S103 by setting the position upward from the slot S1 (step S104: YES, wall). Therefore, it is set downward from the slot S1 (step S109).

If processed likewise from the step S103, the wall and the other accessor 1 do not exist for the slot S2 beneath the slot S1 (step S104: NO). Therefore, the slot S2 is set at the "subject position" (step S105) so as to move the accessor 11 to the slot S2 (step S106). Namely, in a case that the accessor 10 does not collide with the accessor 1, that is, in a case that the handling mechanism 20 is to determined not to collide with the handling mechanism 10, the handling mechanism 20 is moved to the another next position. Once moved, it is determined whether the position is the "target position" of the accessor 11. Here, as the slot S2 is not the final destination (step S107: NO), it returns to the step S102 so as to search for a further next position.

The accessor 11 is moved in order of the slots S6, S10 and S9 while searching for the route as with the procedure. Lastly, when the next position is the drive D1, it is determined to have arrived at the "target position" so as to move it to the drive D1 and finish processing (step S107: YES). Thus, a series of steps for carrying the recording medium 27 from the medium cabinet 22 to the drive 21 are completed. Here, a description will be given by following FIG. 10 as to the procedure for using the auxiliary means described along with FIGS. 4 to 6.

Figure 10:
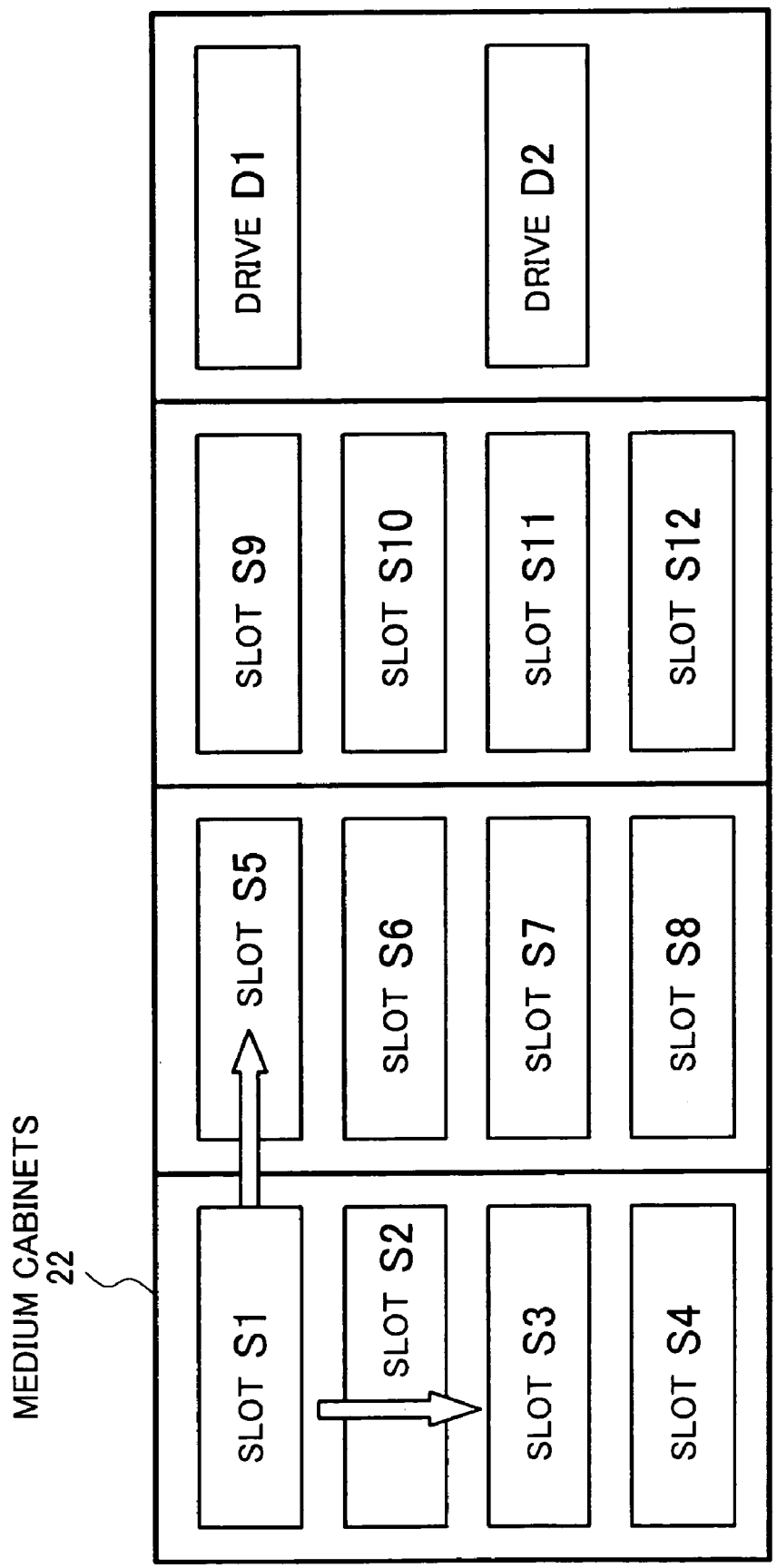
FIG. 10 is a schematic diagram relating to the auxiliary means of the exemplary embodiment.

FIG. 10 is a schematic diagram relating to the auxiliary means of the embodiment. First, the procedure for using the method shown in FIG. 6 will be described. For instance, in the case where the accessor 1 fails and stops in front of the slot S1 of the medium cabinet 22 and the handling mechanism 10 thereof needs to be moved to the front of the slot S5, the handling mechanism 20 of the other accessor 11 is moved to the slot S2. Next, the handling mechanism 20 is raised so as to engage the concave portion 53 of the handling mechanism 10 with the picker 7 of the handling mechanism 20. If the accessor 11 is horizontally moved in this state to the position of the slot S6, the handling mechanism 10 of the accessor 1 travels to the slot S5.

Next, the procedure for using the method shown in FIG. 5 will be described. For instance, in the case where the accessor 1 fails and stops in front of the slot S1 and the handling mechanism 10 thereof needs to be moved to the front of the slot S2, the handling mechanism 20 of the other accessor 11 is moved to the slot S5. It is further moved to the slot S1 side from there so as to engage the convex portion 51 of the handling mechanism 10 with the concave portion 52 of the handling mechanism 20. And if the handling mechanism 20 is vertically moved to the position of the slot S6, the accessor 1 travels to the slot S2 at the same time.

Even if one of the accessors fails at an arbitrary position, it is possible, by using the procedure, to move it with the other accessor to any position causing no difficulty to the operation of the other accessor. It is thus possible to increase efficiency of carrying work of the recording medium 27.

This embodiment uses the connection of the convex and concave portions as the auxiliary means. In addition, there may also be a lock mechanism for locking or unlocking the state of connection according to an instruction of the library control portion 29. The lock mechanism may be either the one for mechanically locking it with a driving portion such as the motor and a claw or the one for magnetically locking it by using an electromagnet. In the case where the recording medium 27 is the magnetic tape as in this embodiment, information is magnetically recorded so that the mechanism for mechanically locking it is preferable. It is possible, by providing such a lock mechanism, to tow the failed handling mechanism so as to move it in four directions in total, i.e. two horizontal directions and two vertical directions.

Figure 11:
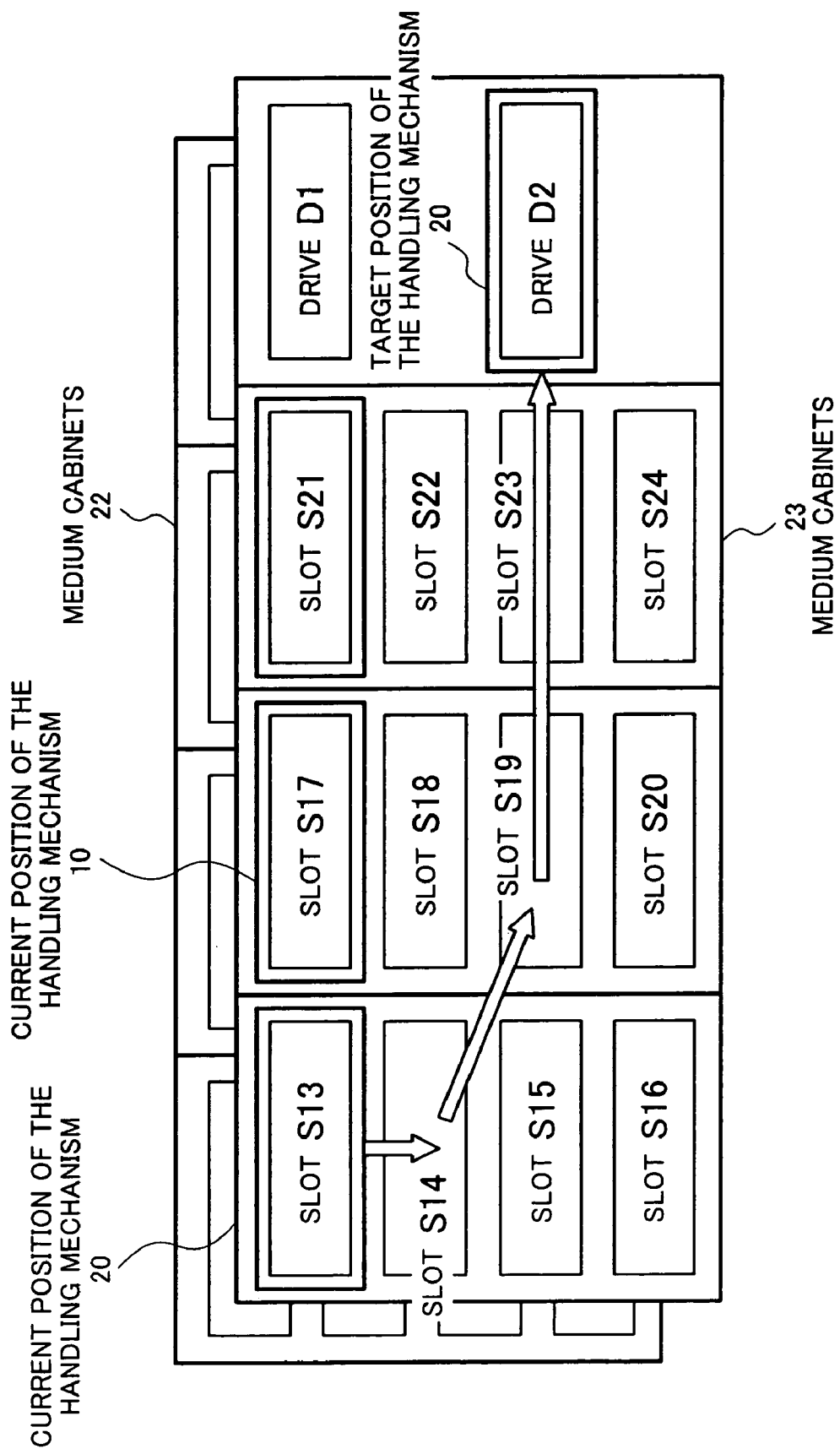
FIG. 11 is a schematic diagram relating to the traveling routes of another exemplary embodiment according to the present invention.
Figure 12:
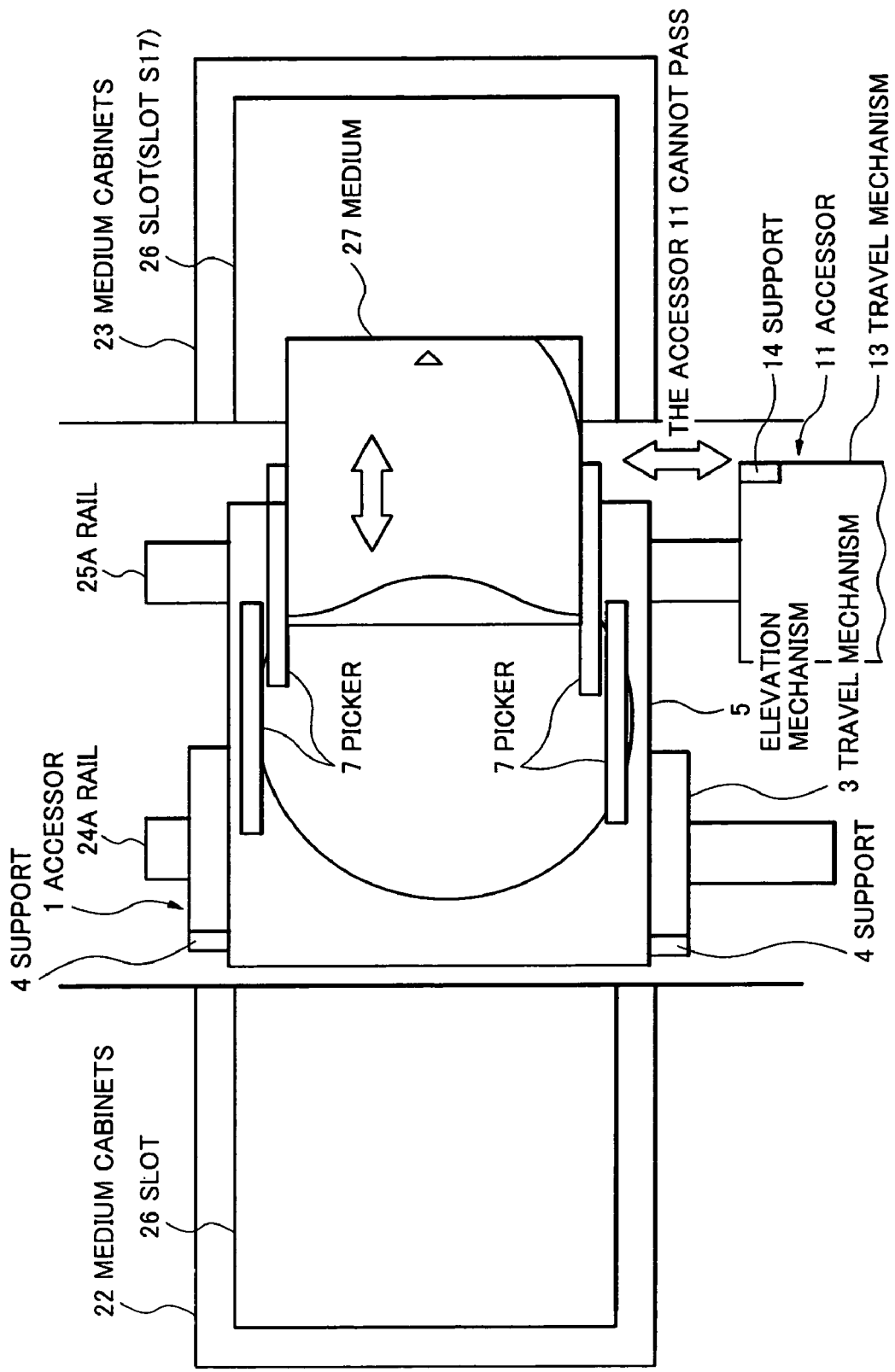
FIG. 12 is a schematic diagram relating to the operation of the handling mechanism of another exemplary embodiment.
Figure 13:
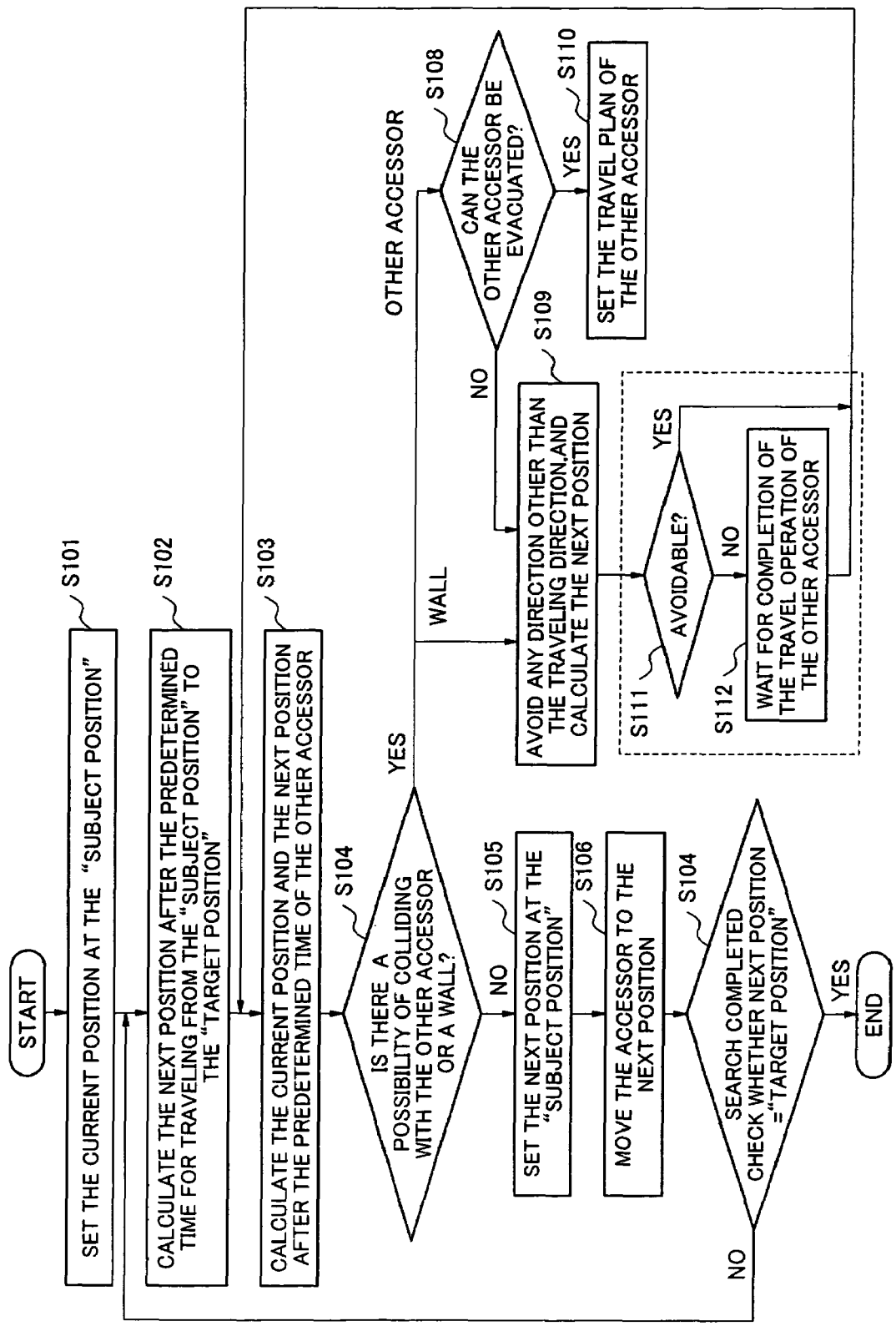
FIG. 13 is a flowchart showing the accessor control method of another exemplary embodiment.

Another embodiment according to the present invention will be described by using FIGS. 11 to 13. FIG. 11 is a schematic diagram relating to the traveling routes of the other exemplary embodiment according to the present invention. FIG. 12 is a schematic diagram relating to the operation of the handling mechanism of the another exemplary embodiment. FIG. 13 is a flowchart showing the accessor control method of the another exemplary embodiment. This embodiment will be described by following the flowchart in FIG. 12 the procedure for, in the library apparatus 100 described in the above-mentioned embodiment, moving the other handling mechanism 20 from the slot S13 to the drive D2 when the handling mechanism 10 is accessing the slots S17 of the medium cabinet 23 shown in FIG. 11. In FIG. 13, the steps other than those enclosed by a broken line (S111 and S112) are basically the same as the flowchart in FIG. 7, and so the descriptions of the same portions are partially omitted.

First, to search for the shortest route from the slot S13 to the drive D2 of the medium cabinet 23, the next position is looked for so that the difference in coordinates from the current position will be smaller. Then, the next position is the slot S18 (step S102), and the handling mechanism 10 is working at the slot S17 over the slot S18. In this case, the recording medium 27 is placed between the elevation mechanism 5 and the medium cabinet 23, and so the gliding of the other accessor 11 using the rail 25a is blocked.

Therefore, it is determined in this case that the accessor 11 may collide with the accessor 1 (step S104: YES, the other accessor). As the handling mechanism 10 which is working cannot be evacuated (step S108: NO), the next position in a different direction from the traveling direction on the shortest route is sought (step S109). If there is no obstacle such as a wall at the acquired next position and the collision is avoidable, it travels to the next position (step S111: YES). Here, the handling mechanism 20 travels from the slot S13 to the slot S14.

Next, if the next position is searched for to follow the shortest route from the slot S14 to the drive D2, it is the slot S19 (step S102). As the other handling mechanism 10 is still accessing the slot S17 and cannot be evacuated (step S104: YES, the other accessor, step S108: NO), the handling mechanism 20 cannot be moved to the slot S19.

In this case, it is also possible to move the handling mechanism 20 to the movable slots S15 and S16 one after another instead of the slot S19 (step S109, S111: YES). In any case, however, the handling mechanism 20 cannot travel to the slots S17, S18, S19 and S20 in the same row while the handling mechanism 10 is accessing the slot S17 of the medium cabinet 23. For that reason, it is determined that the position capable of avoiding the collision cannot be found at a predetermined time so as to wait for completion of the operation of the handling mechanism 10 (step S111: "NO," step S112). Thereafter, once the handling mechanism 10 completes the access to the slot S17 and the picker 7 is retracted, the accessor 11 is operated toward the slot S19. Namely, in a case that the handling mechanism 10 cannot move to another next position and the handling mechanism 20 collides with the handling mechanism 10 at the next seeked position to which the handling mechanism 20 moves for allowing the handling mechanism 20 to move to the target position, the movement of the handling mechanism 20 is stopped until the second handling mechanism 10 leaves the current position.

Thereafter, if operated as with the procedure, the handling mechanism 20 is moved on the route from the slot S13 to the drive D2 by way of the slots S14, S19 and S23 as shown in FIG. 11.

Thus, when moving the handling mechanism 20 of the accessor 11, a working situation of the other accessor 1 is monitored. If consequently determined that the accessor 11 cannot pass, it is possible, by operating it after waiting for the completion of working by accessor 1, to avoid the collision between the accessors 1 and 11 and exert control not to operate the accessor 11 wastefully when possible.

While this invention has been described with reference to illustrative embodiments, this description is not intended to be construed in a limiting sense. Various modifications of the illustrative embodiments as well as the other embodiments of the invention, will be apparent to persons skilled in the art upon reference to this description. It is, therefore, contemplated that the appended claims will cover any such modifications or embodiments as fall within the true scope of the invention.

Further, the inventor's intent is to retain all equivalents of the claimed invention even if the claims are amended during prosecution.

What is claimed is:

1. A data storage library for storing storage media, comprising:
   a first array of storage cells, a storage medium being storable in a cell;
   a first accessor transporting said storage medium, said first accessor including a first carriage storing or retrieving said storage medium on to a storage cell and a first guide guiding said first carriage moving vertically;
   a second accessor transporting said storage medium, said second accessor including a second carriage storing or retrieving said storage medium on to a storage coil and a second guide guiding said second carriage moving vertically; and
   a third guide guiding said first accessor and said second accessor moving horizontally, wherein;
   said first carriage opposes said second carriage and said first and second carriages are in a staggered configuration, when said first guide exists between said first array and said second guide;
   a width of each said first and second carriages is narrower than a distance between said first and second guides; and
   said first carriage and said second carriage are connectable at least one of horizontally and in an overlapping state.

2. The data storage library according to claim 1, further comprising:
   a first moving mechanism allowing said first accessor to move along said third guide; and
   a second moving mechanism allowing said second accessor move along said third guide.

3. The data storage library according to claim 2, further comprising:
   a second array of storage cells, said storage medium being storable in a cell, said second array of storage cells opposing to said first array of storage cells by sandwiching said third guide therebetween; wherein
   a sum of the width of said first and second moving mechanisms is smaller than the distance between said first array of storage cells and said second array of storage cells.

4. The data storage library according to claim 1, wherein said first carriage and said second carriage are mutually connectable and both of the carriages are movable simultaneously by driving one of the first and second carriages.

5. The data storage library according to claim 1, wherein one of said first carriage and said second carriage includes a convex portion and one of said first carriage and said second carriage includes a concave portion, said convex portion and said concave portion being horizontally connectable with each other.

6. The data storage library according to claim 1, wherein one of said first carriage and said second carriage includes a convex portion and one of said first carriage and said second carriage includes a concave portion, said convex portion and said concave portion being connectable to each other in an overlapping state.

7. The data storage library according to claim 1, wherein the plurality of cells of said array are oriented in an extending direction of each of said third guide and in an extending direction of each of said first and second guides.

8. A data storage library for storing storage media comprising:
   a first storage means for storing a storage medium, said first storage means including storage cells;

a first transportation means for transporting said storage medium, said first transportation means including a first storing or retrieving means for storing or retrieving said storage medium on to a storage cell and a first guide means for guiding said first transportation means moving vertically;

a second transportation means for transporting said storage medium, said second transportation means including a second storing or retrieving means for storing or retrieving said storage medium onto a storage cell and a second guide means for guiding said second transportation means moving vertically;

a third guide means for guiding said first transportation means and said second transportation means moving horizontally, wherein;

said first storing or retrieving means opposes said second storing or retrieving means and said first and second storing or retrieving means are in a staggered configuration, when said first guide means exists between said first storage means and said second guide means;

a width of each said first and second transportation means is narrower than a distance between said first and second guide means; and said first transportation means and said second transportation means are connectable at least one of horizontally and in an overlapping state.

9. A data storage library for storing storage media. comprising:

a first array of storage cells, a storage medium being storable in a cell;

a first accessor transporting said storage medium, said first accessor including a first carriage storing or retrieving said storage medium on to said a storage cell and a first guide guiding said first carriage moving vertically;

a second accessor transporting said storage medium, said second accessor including a second carriage storing or retrieving said storage medium on to a storage cell and a second guide guiding said second carriage moving vertically; and a third guide guiding said first accessor and said second accessor moving horizontally, wherein;

said first carriage opposes said second carriage and said first and second carriages are in a staggered configuration, when said first guide exists between said first array and said second guide; and said first carriage and said second carriage are connectable at least one of horizontally and in an overlapping state.

10. The data storage library according to claim 9, wherein both of said first and second carriages are movable simultaneously by driving one of the first and second carriages.

11. The data storage library according to claim 9, wherein one of said first and said second carriage includes a convex portion and one of said first carriage and said second carriage includes a concave portion, said convex portion and said concave portion being horizontally connectable with each other.

12. The data storage library according to claim 9, wherein one of said first and said second carriage includes a convex portion and one of said first carriage and said second carriage includes a concave portion, said convex portion and said concave portion being connectable to each other in an overlapping state.

13. A data storage library for storing storage media comprising:

a first array of storage cells, a storage medium being storable in a cell;

a second array of storage cells, said storage medium being storable in a cell, said second array of storage cells opposing to said first array of storage cells;

a component that includes a storage cell, said storage medium being storable in said components;

a first accessor transporting said storage medium, said first accessor including a first carriage storing or retrieving a storage medium on to a storage cell and a first guide guiding said first carriage moving vertically, said first accessor storing a storage medium on to one of said first array of storage cells, said second array of storage cells, and said storage cells, and said storage cell of said component;

a second accessor transporting said storage medium, said second accessor including a second carriage storing or retrieving said storage medium on to a storage cell and a second guide guiding said second carriage moving vertically; and a third guide guiding said first accessor and said second accessor moving horizontally, wherein;

said first carriage opposes said second carriage and said first and second carriages are in a staggered configuration, when said first guide exists between said first array and said second guide; and said first carriage and said second carriage are connectable at least one of horizontally and in an overlapping state.

14. The data storage library according to claim 13, wherein said component is substantially perpendicular to said first array of storage cells.

* * * * *